United States Patent Office 3,558,607
Patented Jan. 26, 1971

3,558,607
1,3,5(10)-ESTRATRIENE DIESTERS
Nicholas Gueritee, Paris, France, assignor to Societe Theramex, Paris, France, a corporation of France
No Drawing. Continuation-in-part of application Ser. No. 577,528, Sept. 6, 1966. This application Jan. 18, 1968, Ser. No. 698,696
Int. Cl. C07c *173/10*
U.S. Cl. 260—239.5                                 15 Claims

ABSTRACT OF THE DISCLOSURE

New diesters of 1,3,5(10)-estratriene are provided which are characterized by trophic and anabolic activity with little or no hormonal activity. The diesters are prepared from the corresponding mono-esterified hydroxy compounds. The ester groupings are only in the 3,17-positions. The ester group in the 17-position is nicotinoyloxy while that in the 3-position may vary. The 3-hydroxy-17-nicotinoyloxy compound is also a part of the invention.

---

This application is a continuation-in-part of my application Ser. No. 577,528 filed Sept. 6, 1966 and now abandoned.

The present invention relates to estradiol derivatives, namely the liposoluble diesters hereinafter generally and specifically set forth and which are obtained from 3-hydroxy 17β-nicotinoyloxy 1,3,5(10)-estratriene with a corresponding acid anhydride or chloride in the presence of a base which may serve as a solvent. The melting points are taken with a capillary tube, the I.R. spectrum with a Perkin-Elmer apparatus. The reaction scheme is represented as follows:

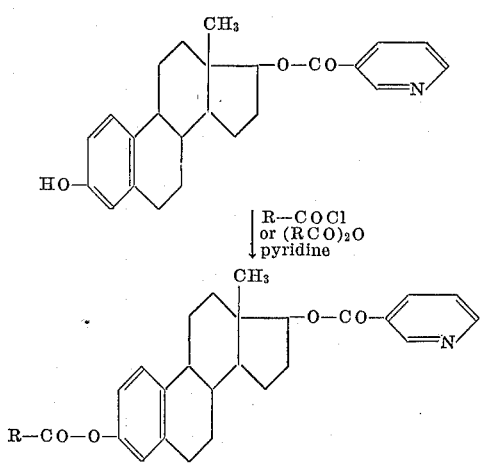

wherein R is aryl, alkyl or aralkyl.

It is well known that natural estrogens, particularly those derived from estratriene, not only have the well known currently exploited hormone, estrogenic and hypophyso-restraining properties, but also certain other very advantageous pharmacodynamic properties whose exploitation in human therapy was hitherto impossible in practice because of the excessive hormone effects accompanying the administration of such substances.

These pharmacodynamic effects are particularly as follows:

Vascular effects (vasodilatation, or even the neo-formation of capillary vessels).

A negative action on the lipidic metabolism with a reduction of the blood cholesterol and a reduction of the atheromatous products.

A trophic action on the proliferation of growth cartilage and osteoblast.

I therefore conducted research for a liposoluble form of the above hydroxy compounds by esterification of the free hydroxyl of each of them with an organic acid. In addition, the choice of this esterification acid should permit control not only of the degree of liposolubility but also of the "delay" properties of these compounds, i.e., the extended action that can be imparted to them.

Esterification tests of this kind were carried out on the 17-beta-nicotinoyloxy derivative because of the better pharmacodynamic performance and the reduction of some of the harmonal properties of this compound. This work led to the discovery of the four 3-beta-esters of the 17-beta-nicotinoyloxy derivative mentioned above. These esters are 3 - beta - benzoyloxy-17-beta-nicotinoyloxy-1,3, 5(10)-estratriene, 3-beta-propionoyloxy-17-beta-nicotinoyloxy-1,3,5(10)-estratriene, 3-beta-heptanoyloxy-17-beta-nicotinoyloxy - 1,3,5(10)-estratriene and 3-beta-hendecanoyloxy - 17-beta nicotinoyloxy-1,3,5(10)-estratriene. Additional 3-beta esters of the present invention are 3-acetoxy, 3-tetra-decanoyloxy, 3-hexadecanoyloxy, 3-octadecanoyloxy, 3 - hexahydrobenzoyloxy, 3 - (cyclopentyl propanoyloxy), 3-(cyclohexyl propanoyloxy), and 3-(phenyl propanoyloxy).

These esters were prepared from the known estradiol 3,17 - dinicotinate, 3-beta-hydroxy-17-beta-mono-nicotinoyloxy-1,3,5(10)-estratriene first being obtained in accordance with the following procedures:

Preparation of 3-beta-hydroxy 17-beta-mono-nicotinoyloxy-1,3,5(10)-estratriene 38 g. of estradiol 3,17-dinicotinate was rapidly added to 800 ml. of a 0.1 N methanol solution of caustic potash with agitation. After the suspension had been agitated for 30 minutes, the crystals which formed were filtered off, dried, washed with methanol or acetone, and then dried in vacuo. The mono-ester (melting point 218–219° C.) was obtained in a practically quantitative yield and in a sufficiently pure state for the subsequent syntheses.

The invention is illustrated by the following non-limitative examples.

EXAMPLE 1

3-propionyloxy-17-nicotinoyloxy-1,3,5(10)-estratriene 9 g. of the monoester obtained above was added to 40 ml. of dry pyridine. 2.5 g. of propionyl chloride was added to the pyridine drop by drop with agitation. Agitation was continued for 3 hours at ambient temperature and the solution then poured into iced water. A thick paste formed which was triturated to crystallization. The crystals were dried and re-suspended in 0.2 N HCl to a pH of 3. The suspension was dried again and water used for washing. The product was recrystallized from 100 ml. of ethanol, dried and 8.3 g. thereof collected. It melted at 122–123° C.

EXAMPLE 2

3-heptanoyloxy-17-nicotinoyloxy-1,3,5(10)-estratriene

The procedure was as above, 5 g. of heptanoyloxy chloride being used for reaction with 11 g. of the mononicotinate. 11 g. of crystallized product was obtained which melted at 99–100° C., after two recrystallizations from ethanol.

EXAMPLE 3

3-hendecanoyloxy-17-nictinoyloxy-1,3,5(10)-estratriene

The procedure was as above, 4.7 g. of hendecanoyloxy chloride being reacted with 8 g. of mononicotinate. After recrystallization from ethanol, 7 g. of product was obtained which melts at 89–90° C.

EXAMPLE 4

3-benzoyloxy-17-nicotinoyloxy-1,3,5(10)-estratriene

The procedure was as above, 1 g. of benzoyl chloride being reacted with 2.4 g. of mononicotinate. The product was washed with water and dried in vacuo and was in the form of 2.6 g. of crystals melting at 160–161° C.

To assess the activity of these various compounds the estrogenic properties on animals were used as an indicator.

EXAMPLE 5

3-acetoxy-17β-nicotinoyloxy-1,3,5(10)-estratriene 5 g. of 3-hydroxy-17β-nicotinoyloxy-1,3,5(10)-estratriene (0.0132) are dissolved in 25 ml. of freshly distilled dry pyridine, 1.55 g. of acetic anhydride (i.e. 15% excess) is added while stirring at room temperature. After this addition, stirring is continued for two more hours, then left in contact overnight. Precipitation takes place in 3 volumes of water, then trituration occurs, up to crystallization. The mixture is decanted, washed and triturated with 0.5 N hydrochloric acid up to pH 3, decanted once more, and a saturated solution of $NaHCO_3$ added. The mixture is dried, washed again with water, and then dried during 24 hours at 70° C.

The yield in crude product is quantitative. After crystallization in methanol, the pure produce is obtained.

Melting point: 162°–163° C.

Anhydrotitrimetry: 100% purity (for $C_{26}H_{29}NO_4$).

Micro-analysis.—Calculated (percent): C, 74.43; H, 6.9. Found (percent): C, 74.36; H, 6.9.

EXAMPLE 6

3-tetradecanoyloxy-17β-nicotinoyloxy-1,3,5(10)-estratriene

To 5 g. of 3-hydroxy-17β-nicotinoyloxy-1,3,5(10)-estratriene suspended in 25 ml. of anhydrous pyridine is added dropwise 3.76 g. of myristoyl chloride (i.e. 15% in excess) while stirring, maintaining the temperature at 20°–25° C. After 2 hours stirring at room temperature, the mixture is allowed to rest overnight, the reaction product is thrown into 3 volumes of water, and triturated up to crystallization. The precipitate is washed with 0.5 N hydrochloric acid, then with water, then triturated with $NaHCO_3$, air dried and washed again with water. Drying takes place in vacuo on $P_2O_5$.

The crude product yield is practically quantative. Recrystallization is carried out twice in acetone and the pure product is obtained.

Melting point: 72° C.

Anhydrotitrimetry: 99.5% purity (for $C_{38}H_{53}NO_4$).

EXAMPLE 7

3-hexadecanoyloxy-17β-nicotinoyloxy-1,3,5(10)-estratriene

Operation takes place like in Example 2, on 5 g. of 3 - hydroxy - 17β - nicotinoyloxy - 1,3,5(10) - estratriene with 20% excess of palmitoyl chloride. After adding chloride and allowing to rest overnight, the reaction product is treated in the usual manner. After drying, 8 g. of crude product are obtained (theory 8.15). After two crystallizations in methanol and acetone, the pure product is obtained.

Melting point: 77–78° C.

Anhydrotitrimetry: 100.4% purity (for $C_{40}H_{57}NO_4$).

EXAMPLE 8

3-octadecanoyloxy-17β-nicotinoyloxy-1,3,5(10)-estratriene

The same method of operation is used as in Example 2. Operation on 5 g. of 3-hydroxy-17β-nicotinoyloxy 1,3,5(10)-estratriene in pyridine with 4.6 g. of stearoyl chloride. The crude product is crystallized twice in acetone.

The pure product melts at 80–82° C.

Anhydrotitrimetry: 99% purity (for $C_{42}H_{61}NO_4$).

EXAMPLE 9

3-hexahydrobenzoyloxy-17β-nicotinoyloxy-1,3,5(10)-estradiene

Using the same mode of operation as for the above esters, starting with 5 g. of 3-hydroxy-17β-nicotinoyloxy-1,3,5(10)-estratriene, 2.25 g. of the chloride of cyclohexane carboxylic acid and 25 ml. of pyridine, 6.40 g. of crude product are obtained (theory 6.45). After two crystallizations in methanol, the pure product is obtained.

Melting point: 115° C.

Anhydrotitrimetry: 99.3% purity (for $C_{31}H_{37}NO_4$).

Microanalysis.—Calculated (percent): C, 76.35; H, 7.64. Found (percent): C, 76.71; H, 7.68.

EXAMPLE 10

3-(cyclopentylpropanoyloxy)-17β-nicotinoyloxy-1,3,5(10)-estratriene

Same method of operation, for similar amounts as in the preceding test; the crude product is obtained with 3-cyclopentylpropanoyl chloride. After two crystallizations in a mineral oil methanol-ether mixture, the pure product is obtained.

Melting point: 102° C.

Anhydrotitrimetry: 99.2% purity (for $C_{32}H_{39}NO_4$).

EXAMPLE 11

3-(cyclohexylpropanoyloxy)-17β-nicotinoyloxy-1,3,5(10)-estratriene

Same method of operation, for similar amounts, with propanoic cyclohexyl acid chloride. The crude product is obtained with a substantially quantitative yield. After two crystallizations, in methanol, then in acetone, the pure product was obtained.

Melting point: 118–119° C.

Anhydrotitrimetry: 99.6% purity (for $C_{33}H_{41}NO_4$).

EXAMPLE 12

3-(phenylpropanoyloxy)-17β-nicotinoyloxy-1,3,5(10)-estratriene

Same method of operation with propanoic 3-phenyl acid chloride. The crude product crystallizes in the form of a gel in alcohols. After two crystallizations in alcohols and a crystallization in methanol/petroleum ether mixture, the pure product is obtained.

Melting point: 82°–93° C.

Anhydrotitrimetry: 99.8% purity (for $C_{33}H_{35}NO_4$).

The following results were obtained:

(a) In adult and castrated female rats.—Forty rats weighing about 120 g. were castrated. Ten days later, after a check on vaginal cytology had confirmed the effects of castration, each animal of the 4 batches received a single injection of a solution in olive oil of the equivalent of 1 mg. per kg. of basic hormone of each of the 4 esters under examination.

Vaginal smears were taken daily and the delay time was established as being the time during which 50% at least of the animals under experiment remain in estrus.

(b) In immature mice.—Forty immature mice weighing from 13 to 17 g. and divided into 4 batches were treated subcutaneously with a dose equivalent to 50 mg./kg. of basic hormone of each of the four esters. A supplementary batch of 10 untreated mice was kept as a control. All the animals were killed 48 hours after the injection. It was found that the most reduced natro-hydropexic action was that produced with 3-beta-benzoyloxy and 3-beta-propionyloxy esters.

The table below gives details of the results obtained with the castrated female rat and immature mice.

TABLE

| | Estrus, castrated female rat | | Uterine cornu, immature mouse | |
|---|---|---|---|---|
| | Time, days | Slope of curve | Weight, mg./10 grams mouse | Increase ratio |
| 3-beta-benzoyloxy-17-beta-nicotinoyloxy-1,3,5(10)-estratriene. | 30 | Irregular | 25 | 2.6 |
| 3-beta-propionoyloxy-17-beta-nicotinoyloxy-1,3,5(10)-estratriene. | 23 | Regular | 25 | 2.6 |
| 3-beta-heptanoyloxy-17-beta-nicotinoyloxy-1,3,5(10)-estratriene. | 42 | Irregular | 31.3 | 3.3 |
| 3-beta-hendecanoyloxy-17-beta-nicotinoyloxy-1,3,5(10)-estratriene. | 72 | Almost regular | 26.7 26.7 | 1 1 |
| Untreated controls | / | / | 9.4 | 1 |

From the above test results it appears that the propionic acid ester is even better than the other three because it has the most regular action, has a moderate delay and has the lowest natro-hydropexic action. Clinical tests intended to show the advantages of the invention in human medicine were therefore carried out on the latter ester.

Clinical examination of 3-beta-propionoyloxy-17-beta-nicotinoyloxy-1,3,5(10)-estratriene The compound for examination was administered by intramuscular injection in unitary doses ranging from 1 to 2.5 mg. and at intervals of 10 to 20 days, to both children and adults with the following results:

(a) in children: acceleration of statural development, without any gynaecomastia;
(b) in castrated women and following the menopause;
   an extraordinary reduction within 6 weeks of peripheral insensitivity in a demyelinization syndrome following achylia gastrica of long standing;
   rapid attenuation of esteoporotic pains;
   improvement of seborrhoea of the scalp;
   the transformation of a psychodepressive ovarioprive state;
(c) in the adult man with coronary thrombosis after-effects: an improvement of tolerance to exertion.

The esters according to the invention can be administered in the form of oily solutions in sterile ampoules of a capacity of say, 1 ml., the amount of ester contained in such ampoule corresponding to a given basic dose. By way of example, one form of administration of propionic ester may consist of a sterile ampoule of a capacity of 1 ml. of olive oil dosed with a weight of 3-beta-propionoyloxy 17-beta-nicotinoyloxy-1,3,5(10) - estratriene corresponding to a weight of from 0.5 to 5.0 mg. 3-beta, 17- beta-di-hydroxyl-1,3,5(10)-estratriene, the optimum doses being about 0.5 mg. for children and 2 mg. for adults. The product is administered by intra-muscular injection at the rate of 1 ampoule every 10 to 30 days according to the degree of accumulation it is required to produce.

The capacity of the ampoules, the solvent, and the active constituent content may naturally be modified, the method of administration being adapted to each case. In practice, the solvent may be any pharmaceutically acceptable oily solvent compatible with the need to ensure good solubility of the constituents. It may also contain adjuvants adapted to strengthen the therapeutic value of these constituents, for example liposoluble vitamins.

The new diesters are represented by the formula:

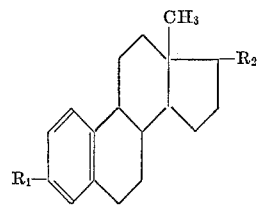

in which $R_1$ is aroyloxy, acyloxy, aralkoyloxy or alkanoyloxy and $R_2$ is nicotinoyloxy.

What is claimed is:
1. A compound of the formula:

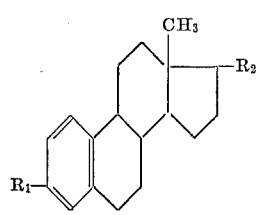

in which $R_1$ is hydroxy, aroyloxy, acyloxy derived from a carboxylic acid or aralkoyloxy and $R_2$ is nicotinoyloxy.

2. The compounds of claim 1 in which $R_1$ is acyloxy of 3 to 18 carbon atoms.

3. The compound of claim 1 which is 3-hydroxy-17β-nicotinoyloxy-1,3,5(10)-estratriene.

4. The compound of claim 1 which is 3-propionoyloxy-17-β-nicotinoyloxy-1,3,5(10)-estratriene.

5. The compound of claim 1 which is 3-benzoyloxy-17-β-nicotinoyloxy-1,3,5(10)-estratriene.

6. The compound of claim 1 which is 3-heptanolyoxy-17-β-nicotinoyloxy-1,3,5(10)-estratriene.

7. The compound of claim 1 which is 3-hendecanoyl-oxy-17-β-nicotinoyloxy-1,3,5(10)-estratriene.

8. The compound of claim 1 which is 3-acetoxy-17β-nicotinoyloxy-1,3,5(10-estratriene.

9. The compound of claim 1 which is 3-tetradecanoyl-oxy-17β-nicotinoyloxy-1,3,5(10)-estratriene.

10. The compound of claim 1 which is 3-hexadecanoyl-oxy-17β-nicotinoyloxy-1,3,5(10)-estratriene.

11. The compound of claim 1 which is 3-octadecanoyl-oxy-17β-nicotinoyloxy-1,3,5(10)-estratriene.

12. The compound of claim 1 which is 3-hexahydro-benzoyloxy-17β-nicotinoyloxy-1,3,5(10)-estradiene.

13. The compound of claim 1 which is 3-(cyclopentyl-propanoyloxy)-17β-nicotinoyloxy-1,3,5(10)-estratriene.

14. The compound of claim 1 which is 3-(cyclohexyl-propanoyloxy)-17β-nicotinoyl-1,3,5(10)-estratriene.

15. The compound of claim 1 which is 3-propanoyloxy)-17-β-nicotinoyloxy-1,3,5(10)-estratriene.

References Cited

UNITED STATES PATENTS 2,842,567  7/1958  Haack et al. _____ 260—397.4
2,885,413  5/1959  Hogg et al. _____ 260—397.45
3,051,856  10/1962 Zirm et al. _____ 260—239.5

HENRY A. FRENCH, Primary Examiner

U.S. Cl. X.R.

424—241

PO-1050
(5/69)

UNITED STATES PATENT OFFICE
CERTIFICATE OF CORRECTION

Patent No. 3,558,607      Dated January 26, 1971

Inventor(s) Nicolas Gueritee

It is certified that error appears in the above-identified patent and that said Letters Patent are hereby corrected as shown below:

Claim 15, line 1, "3-propanoyloxy)-" should read

-- 3-(phenylpropanoyloxy)- --

Signed and sealed this 17th day of August 1971.

(SEAL)
Attest:

EDWARD M. FLETCHER, JR.
Attesting Officer

WILLIAM E. SCHUYLER,
Commoissioner of Pat(